(12) United States Patent
Yang et al.

(10) Patent No.: US 7,170,869 B2
(45) Date of Patent: Jan. 30, 2007

(54) METHOD AND SYSTEM FOR APPLYING A MULTI-PROTOCOL LABEL SWITCHING NETWORK IN GENERAL PACKET RADIO SERVICE

(75) Inventors: Jen-Shun Yang, Hsinchuang (TW); Chien-Hsin Wang, Chungho (TW); Chien-Chao Tseng, Hsinchu (TW); Jen-Chi Liu, Hsinchu (TW)

(73) Assignee: Industrial Technology Research Institute, Chutung (TW)

( * ) Notice: Subject to any disclaimer, the term of this patent is extended or adjusted under 35 U.S.C. 154(b) by 1082 days.

(21) Appl. No.: 10/134,528

(22) Filed: Apr. 30, 2002

(65) Prior Publication Data

US 2003/0142643 A1    Jul. 31, 2003

(30) Foreign Application Priority Data

Jan. 23, 2002    (TW) ............................. 91101092 A

(51) Int. Cl.
| | |
|---|---|
| H04Q 7/00 | (2006.01) |
| H04Q 7/20 | (2006.01) |
| H04B 7/216 | (2006.01) |
| H04J 3/24 | (2006.01) |
| H04J 3/16 | (2006.01) |
| H04L 12/28 | (2006.01) |

(52) U.S. Cl. ...................... 370/328; 370/335; 370/349; 370/389; 370/392; 370/469; 455/432.1; 709/242

(58) Field of Classification Search ................... None
See application file for complete search history.

(56) References Cited

U.S. PATENT DOCUMENTS

| | | | |
|---|---|---|---|
| 6,374,303 B1* | 4/2002 | Armitage et al. | 709/242 |
| 6,765,921 B1* | 7/2004 | Stacey et al. | 370/401 |
| 6,839,339 B1* | 1/2005 | Chuah | 370/349 |
| 6,842,615 B2* | 1/2005 | Angin | 455/432.1 |
| 6,895,008 B2* | 5/2005 | Enoki et al. | 370/392 |
| 6,950,398 B2* | 9/2005 | Guo et al. | 370/235 |
| 6,985,447 B2* | 1/2006 | Gibson et al. | 370/255 |
| 7,023,820 B2* | 4/2006 | Chaskar | 370/329 |

\* cited by examiner

*Primary Examiner*—Chi Pham
*Assistant Examiner*—Melanie Jagannathan
(74) *Attorney, Agent, or Firm*—Bacon & Thomas, PLLC

(57) ABSTRACT

The present invention discloses a method for applying a multi-protocol label switching (MPLS) network in general packet radio service (GPRS). The MPLS network is established by multiple differentiated service (DS) domains. Each DS domain is constructed by multiple label switching routers (LSRs) and label edge routers (LERs). The LER provides at least a service GPRS supporting node (SGSN) connected to a wireless network base station, and a gate GPRS supporting node (GGSN) connected to a packet switching network. At a signalling plane, IP addresses of all SGSNs and GGSNs are utilized to establish all one-to-one pre-created label switching paths (LSPs) in the MPLS network of the GPRS backbone network. At a transmission plane, the pre-created LSP and LSP tunneling transmit packets between SGSN and GGSN.

12 Claims, 8 Drawing Sheets

METHOD AND SYSTEM FOR APPLYING A MULTI-PROTOCOL LABEL SWITCHING NETWORK IN GENERAL PACKET RADIO SERVICE

BACKGROUND OF THE INVENTION

1. Field of the Invention

The present invention relates to the technical field of General Packet Radio Service (GPRS) and, more particularly, to a method and a system for applying a multi-protocol label switching network in general packet radio service.

2. Description of Related Art

GPRS is defined in the standard of Global System for Mobile communication (GSM) phase 2+ for providing transmission service of packet switching, which utilizes the technique of packet mode to transmit data and control message in GSM network at a rate of approximately 120 kbps. FIG. 1 shows a GPRS core network 10 and its architecture, while FIG. 2 shows the signalling plane and transmission plane at the Gn interface of the GPRS architecture, which are five-layer and six-layer structures, respectively.

Because GPRS architecture clearly distinguishes the wireless sub-network and wired sub-network, the backbone network formed by the wired sub-network can be constructed by repeatedly utilizing the existing network architecture, such as the Internet, or new network architecture, such as Multiple Protocol Label Switching (MPLS). Such a method of distinguishing wireless sub-networks and wired sub-networks is accomplished by two newly defined network nodes, which are the Serving GPRS Support Node 12 (SGSN) connected to the base station of the wireless network, and the Gateway GPRS Support Node 13 (GGSN) connected to the external packet switching network 15. SGSN 12 is responsible for tracing and managing the position of a Mobile Station 14 (MS), performing the functions of verification, scheduling and medium access control in packet transmission. GGSN 13 is responsible for routing to the external packet switching network 15 to exchange packets, and utilizing the IP-based GPRS backbone 11 to communicate with the SGSN 12.

For a specific MS 14, GGSN 13 can use IP tunneling techniques to establish a dedicated communicating tunnel particularly between SGSNs 12 that the MS 14 belongs to, such that the MS 14 can access data of the external packet switching network 15. The establishment of this dedicated communicating tunnel and its location and verification information are accomplished by a PDP context activation procedure. This procedure will establish related PDP context tables in MS 14, SGSN 12 and GGSN 13, respectively, for storing information related to the communicating tunnel, mobile station identification and verification, wherein the PDP context tables in SGSN/GGSN are stored with the IP addresses of the GGSN/SGSN corresponding to the two ends of the communicating tunnels. In addition, the GPRS Tunneling Protocol (GTP) in the GPRS protocol defines the GPRS control messages, including control messages related to the PDP context activation procedure, and also defines the packet format and GTP header of the data packet in using IP tunnel techniques. The GTP header includes a set of Tunnel IDs (TIDs) for use by SGSN to identify a specific mobile station in the wireless sub-network.

As GPRS backbone network uses IP tunnel techniques to establish a dedicated communicating tunnel between GGSN 13 and SGSN 12, MS 14 is able to access data of the external packet switching network 15. However, such a technique also results in drawbacks such as increasing the length of the packet header, increasing the IP route delay and difficulty in supporting the quality of service. These drawbacks severely influence the GPRS backbone network transmission efficiency. Therefore, it is desirable for improvements in the above conventional GPRS architecture.

SUMMARY OF THE INVENTION

It is an object of the present invention to provide a method and a system for applying a multi-protocol label switching network in general packet radio service to shorten transmitted packet headers. It is another object of the present invention to provide a method and a system for applying a multi-protocol label switching network in general packet radio service to reduce the routing delay.

It is yet another object of the present invention to provide a method and a system for applying a multi-protocol label switching network in general packet radio service to support the quality of service (QoS).

To achieve the objects, according to one aspect of the present invention, there is provided a system for applying a multi-protocol label-switching (MPLS) network in general packet radio service (GPRS), wherein the MPLS network is established by multiple differentiated service (DS) domains, and each DS domain is constructed by multiple label switching routers (LSRs) and label edge routers (LERs). The system comprises at least a LER for use as a service GPRS supporting node (SGSN) connected to a wireless network base station, and at least a LER for use as a Gateway GPRS supporting node (GGSN) connected to a packet switching network. The SGSN interfaces to the LSR of its DS domain via a Gn interface. The GGSN interfaces to the LSR of its DS domain via the Gn interface. When the Gn interface is used for a signaling plane between two SGSNs, between two GGSNs, or between a SGSN and a GGSN, it has a protocol stack that includes a physical layer, a MPLS layer and a RSVP/GTP layer from bottom to top, so as to utilize IP addresses of all SGSNs and GGSNs to establish all one-to-one pre-created label switching paths (LSPs) in the MPLS network of a GPRS backbone network in an initial state. When the Gn interface is used for a transmission plane in GGSN, it has a protocol stack including a physical layer; a MPLS layer, a GTP layer and an IP layer from bottom to top. The Gn interface at a transmission plane for SGSN has a protocol stack including a physical layer, a MPLS layer, a GTP layer and a relay layer from bottom to top, so as to transmit packets between SGSN and GGSN with pre-created LSP and LSP tunneling.

In accordance with another aspect of the present invention, there is provided a method for establishing the pre-created LSPs and LSP tunnel in a GPRS backbone network. The method has the advantages of: (A) at a signalling plane, utilizing IP addresses of all SGSNs and GGSNs to establish all one-to-one pre-created label switching paths (LSPs) in a GPRS backbone network; and (B) at a transmission plane, transmitting packets between SGSN and GGSN with pre-created LSP and LSP tunneling.

Other objects, advantages, and novel features of the invention will become more apparent from the following detailed description when taken in conjunction with the accompanying drawings.

DETAILED DESCRIPTION OF THE PREFERRED EMBODIMENT

The method and system for applying a multi-protocol label switching network in general packet radio service in accordance with the present invention are designed by utilizing MPLS technique and particularly based on the GPRS network feature to improve the transmission efficiency, wherein MPLS is a new generation of IP switching techniques proposed by the Internet Engineering Task Force (IETF) for integrating label swapping and IP routing in order to increase the routing efficiency of a network layer, the expanding capability of a network layer and the convenience of adding routing services, and support the quality of service. The MPLS standard may also utilize various link layer techniques to carry label information, for example, ATM networks, PPP networks, or frame relays.

A complete MPLS network is established by multiple Differentiated Service (DS) domains. Multiple Label Switching Routers (LSRs) and Label Edge Routers (LERs) construct each DS domain. LSR is responsible for performing label switching on the packets with labels. LER can be an ingress node, located at the entrance of the MPLS DS domain, or an egress node, located at the exit of the MPLS DS domain. When establishing or releasing a signal route, the LSR is responsible for the conversion between the IP packet and label. As an ingress node, the LER is responsible for classifying, monitoring and managing the data packets, executing link allowance control, and interacting with the neighboring DS domains. As an egress node, LER is responsible for removing labels from data packets. Data packet transmission to the MPLS network uses Resource reservation Protocol (RSVP) or Label Distribution Protocol (LDP) to distribute corresponding routes and labels to the LSR along the routed path, so that the whole signal route becomes a dedicated Label Switching Path (LSP). After establishing the LSP, only second layer label switching is required when the labeled packet passes LSR, without the requirement of reading the IP address and header of each packet, thereby increasing the speed of the network.

Figure 1:
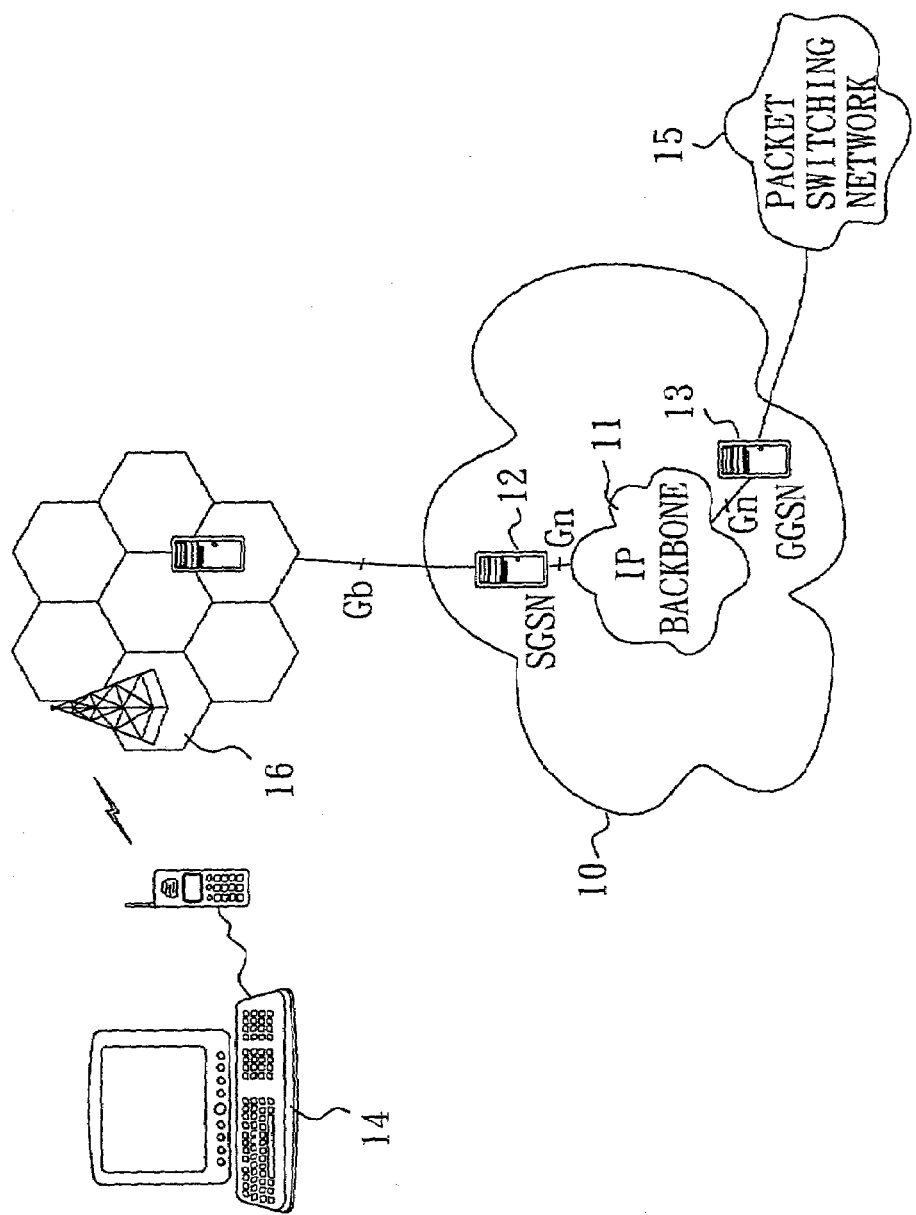
FIG. 1 shows a conventional GPRS core network and its architecture.
Figure 2:
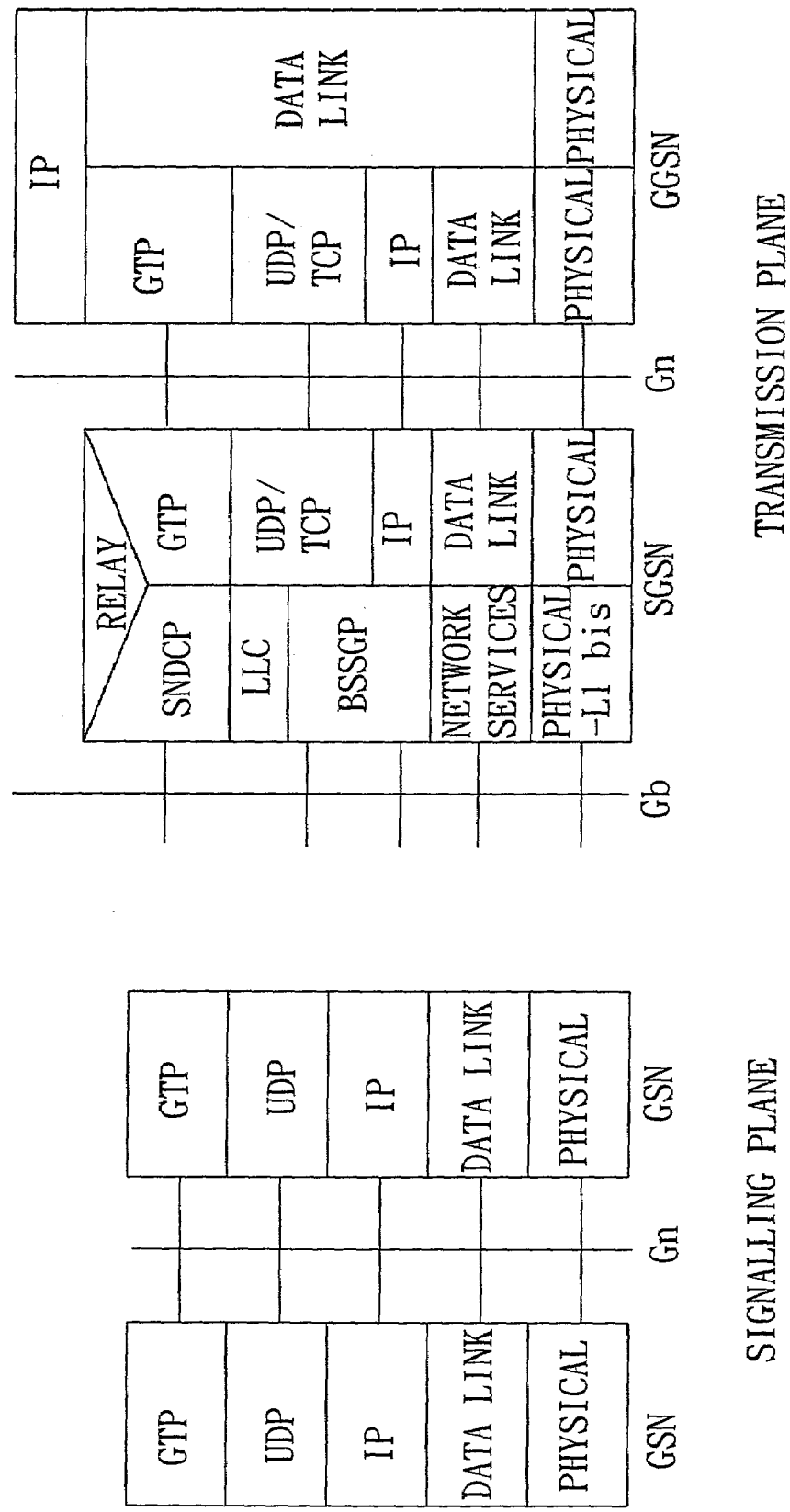
FIG. 2 shows the signalling plane and transmission plane at the Gn interface of conventional GPRS architecture.
Figure 3:
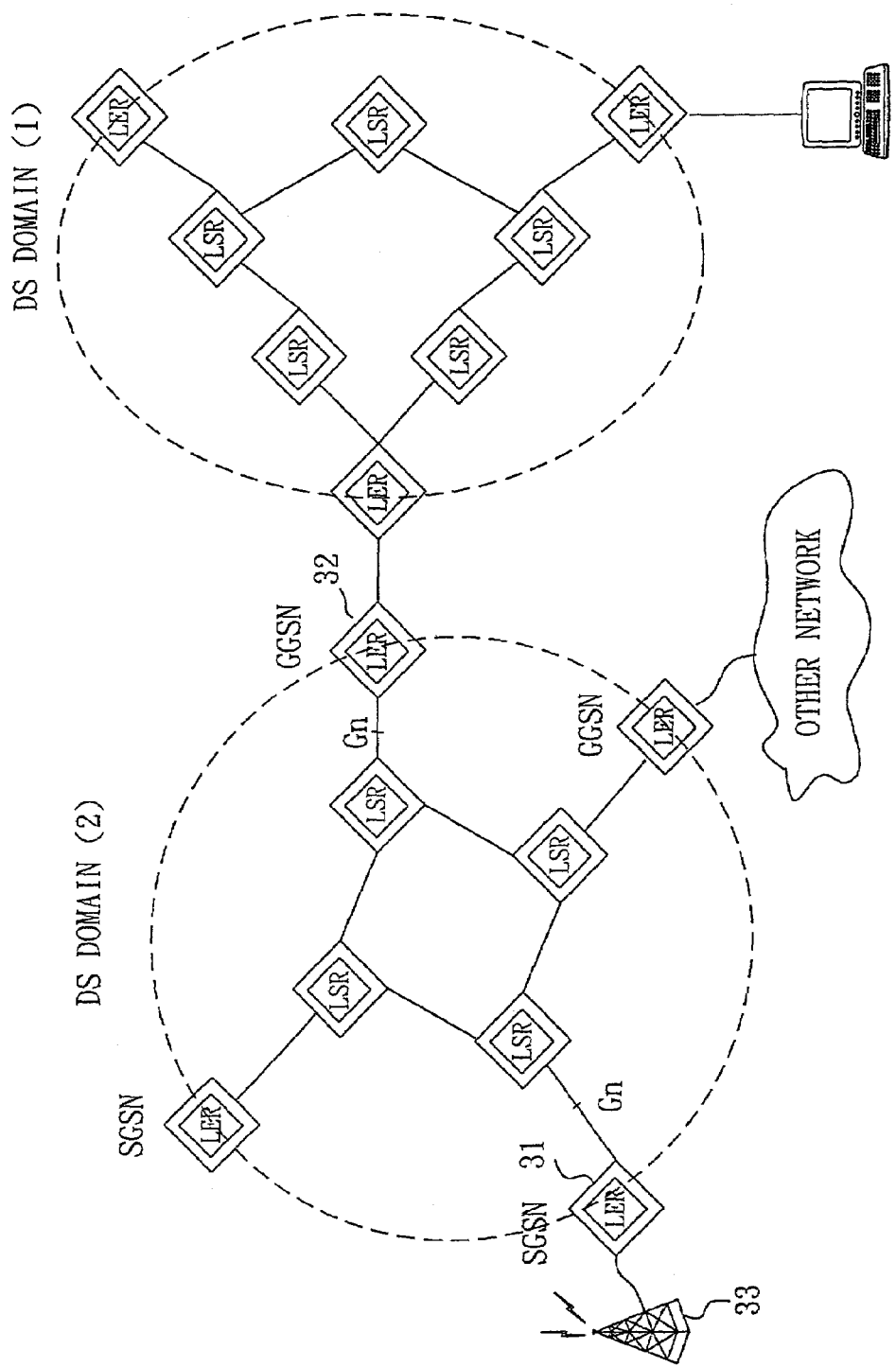
FIG. 3 shows system architecture for applying the MPLS network to GPRS in accordance with the present invention.
Figure 4:
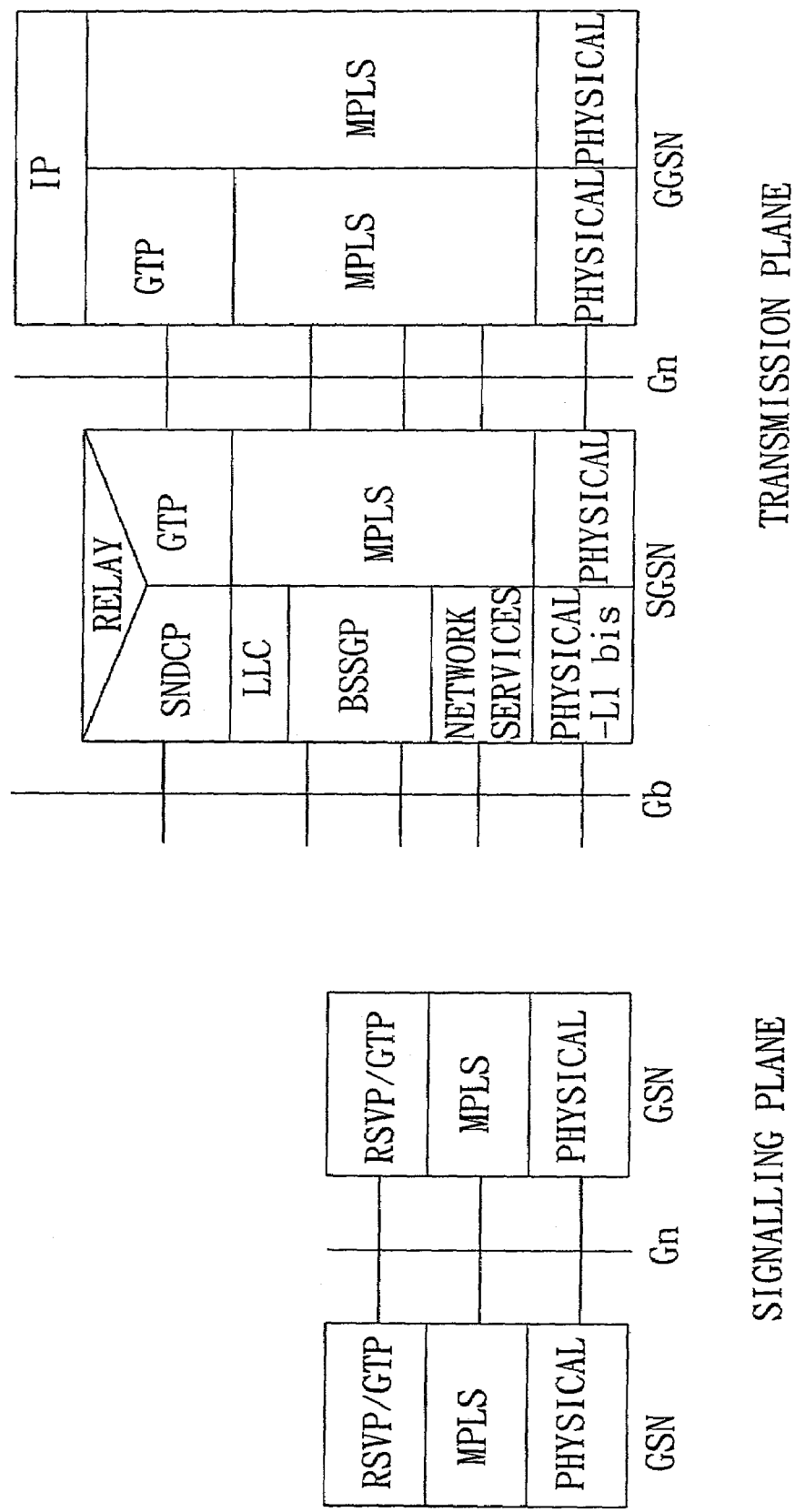
FIG. 4 shows the Gn interface protocol stacks for the signalling plane and transmission plane in accordance with the present invention.

FIG. 3 shows a system architecture for applying the aforementioned MPLS network technique into GPRS, wherein the DS domain (2) represents a GPRS network utilizing MPLS technique, and the DS domain (1) represents an external packet switching network. DS domain (2) includes at least a LER 31 used as a SGSN and a LER 32 used as a GGSN. The SGSN is connected to BS 33 of a wireless network, and the GGSN is connected to a DS domain (1) LER. The interface between the SGSN/GGSN and the DS domain (2) LSR is denoted as Gn. FIG. 4 further shows the Gn interface protocol stacks for the signalling plane and transmission plane in accordance with the present invention. As shown, the Gn interface protocol stack for the signalling plane between two SGSNs, between two GGSNs, or between SGSN and GGSN has a three-layer architecture including a physical layer, a MPLS layer and a RSVP/GTP layer from bottom to top, so as to provide the following protocol stacks:

(1) RSVP/MPLS protocol stack: In the initial state of the present system, RSVP extension utilizes the IP addresses of all SGSNs and GGSNs to establish all one-to-one pre-created LSPs in the MPLS network of the GPRS backbone network. The details of establishing one-to-one pre-created LSPs is described hereinafter.

(2) GTP/MPLS protocol stack: If the pre-created LSPs have been established, the GTP protocol managing control message can utilize the pre-created LSP for switching.

Figure 5:
FIG. 5 shows the packet format in accordance with the present invention.

The SGSN/GGSN transmission plane has a four-layer architecture. The Gn interface protocol stack of a GGSN includes a physical layer; a MPLS layer, a GTP layer and an IP layer from bottom to top. The Gn interface protocol stack of a SGSN includes a physical layer, a MPLS layer, a GTP layer and a relay layer from bottom to top. In comparison to conventional GPRS transmission plane architecture in the present invention, the UDP/TCP and the IP layer in the conventional GPRS protocol stack have been removed, and their functions have been completely substituted by the MPLS protocol at the second layer, thereby decreasing the packet header length. For the IP packet transmitted downward from the external packet switching network, GGSN checks its IP address to search the corresponding PDP context table. Then, the International Mobile Subscriber Identifier (IMSI) and Network layer Service Access Point Identifier (NSAPI) recorded in the PDP context table are taken out, and the TID field in the GTP header is set and packaged in front of the IP packet. The GGSN also takes out the pre-created LSP ID of the corresponding SGSN, and finds the corresponding label and output link from the LSP label mapping table. Finally, the label is placed in the MPLS header and packaged in front of the GTP header, and the packet is subsequently sent to the output link. The output packet format is shown in FIG. 5, wherein the GTP header carries IMSI and NSAPI enabling the SGSN to identify a MS, and transmit packets to a designated MS via the wireless sub-network. For the packet transmitted upward from MS, it is sent to the designated GGSN based on a flow opposite in direction to the above flow.

Figure 6:
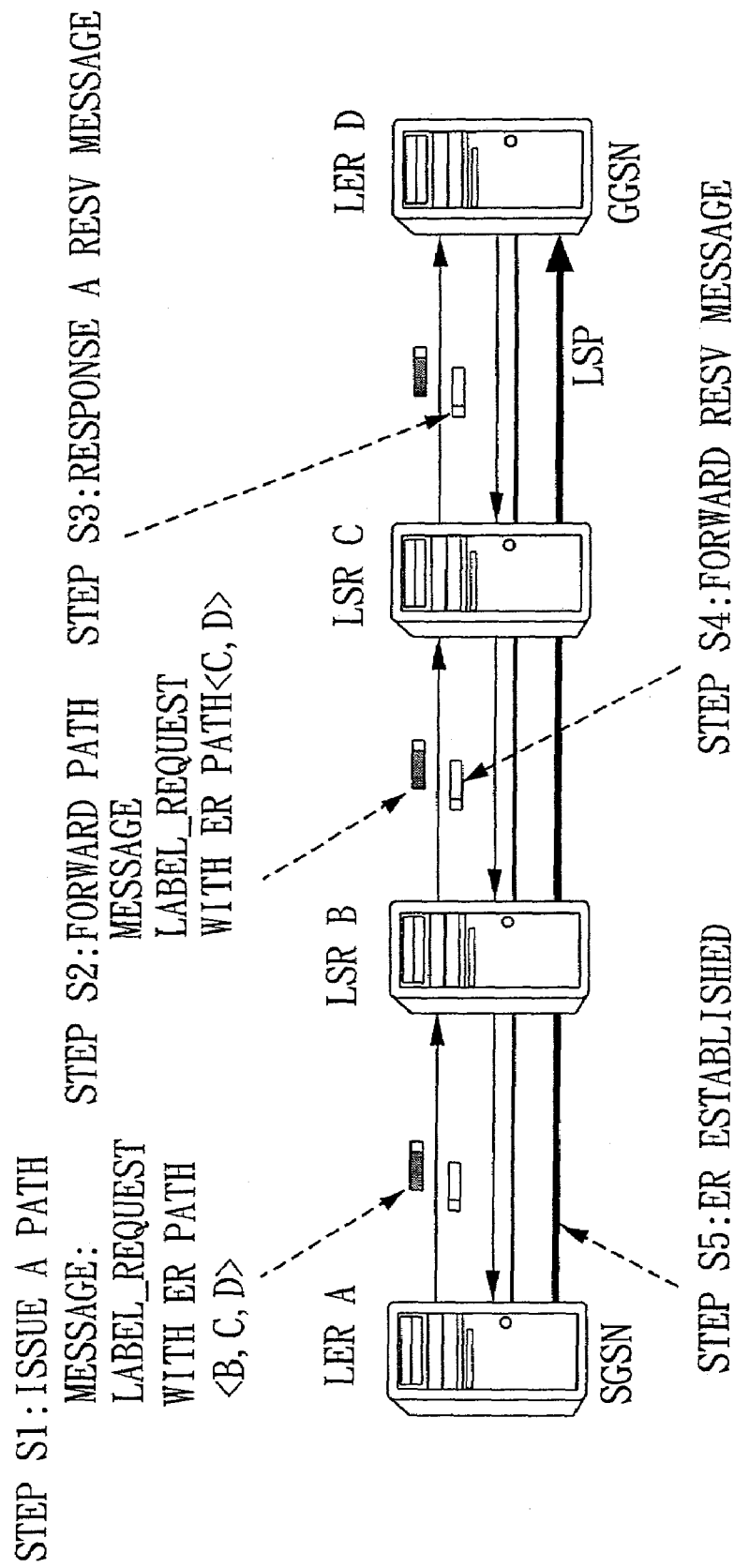
FIG. 6 shows a flow to establish the pre-created LSP in accordance with the present invention.

As aforementioned, the present method utilizes RSVP extension control messages to establish pre-created LSP links when the system is initialized. To describe the establishment flow of the pre-created LSP, it is assumed that the LSP to be established is an uplink route from SGSN to GGSN. That is, the SGSN is equivalent to the DS domain ingress node and must have LER capability, and the GGSN is equivalent to the DS domain egress node, and must also have LER capability. With reference to FIG. 6, the establishment flow is as follows:

(Step S1) The ingress node issues a path message including LABEL_REQUEST with Explicit Route (ER) path. If this LSP intends to reserve bandwidth on the LSR of the path, it must include a DIFFSERV object. The LABEL_REQUEST will request the LSRs on the ER path to establish label mapping tables based on the Forward Equivalent Class (FEC) corresponding to the prefix of IP addresses of egress nodes.

(Step S2) The path message is forwarded to all LSRs on the ER path. When the path message passes a LSR, the LSR executes the following operations:

(1) LSR establishes a label corresponding item of FEC in the label mapping table. The input link number and corresponding label in the table are known and filled in, while the output link number and corresponding label are blank.

(2) If the path message includes the DIFFSERV object, LSR will reserve a predetermined bandwidth based on the content of the DIFFSERV object and its capability, and set the PHB Schedule Classifying (PSC) and packet dropping precedence of this FEC.

(Step S3) When receiving the path message, the egress node will reference the DIFFSERV object and its capability to determine the traffic/QoS parameters of this LSP. Then, these parameters together with the labels corresponding to the input link are placed in a response message (Resv message) for delivery to the ingress node along the original path, (Step S4) The response message is sent to all LSRs on the ER path. When the response message passes a LSR, the LSR executes the following operations:

(1) LSR fills in the output link number and corresponding label for the label corresponding item of the original FEC in the label mapping table.

(2) If the response message includes traffic/QoS parameters, LSR will update the reserved bandwidth based on the traffic/QoS parameters, and modifies the PSC and packet dropping precedence of this FEC.

(Step S5) When receiving the response message, the ingress node establishes a LSP label mapping table, thereby completing the establishment of the pre-created LSP.

The LSPs pre-created by the above flow can be subsequently used by the PDP context activation procedure. That is, when receiving an activate PDP context request from a MS, the SGSN starts to select a pre-created LSP going to the GGSN, and uses this pre-created LSP to transmit a create PDP context request. Next, when receiving the create PDP context request transmitted from the SGSN, the GGSN selects a pre-created LSP going to the SGSN, and uses this pre-created LSP to transmit a create PDP context response. At this moment, the GGSN determines whether the QoS is required for the data stream, and if yes, the GGSN starts to establish a Label only inferred per hob behavior scheduling class LSP (L-LSP) going to the SGSN. When the L-LSP is created, the L-LSP ID is stored in the PDP context SGSN address field, and then data is transmitted to the SGSN. On the contrary, if the data stream does not require QoS, SGSN will store the ID of the pre-created LSP in a SGSN address field of the PDP context, and then transmit data to the SGSN. The SGSN then receives the create PDP context response transmitted from the GGSN.

In the above flow, if the GGSN or the SGSN cannot find a corresponding pre-created LSP, conventional IP routing is employed to send a GTP signal to the corresponding destination, and a LSP is created immediately targeted to the destination.

Figure 7:
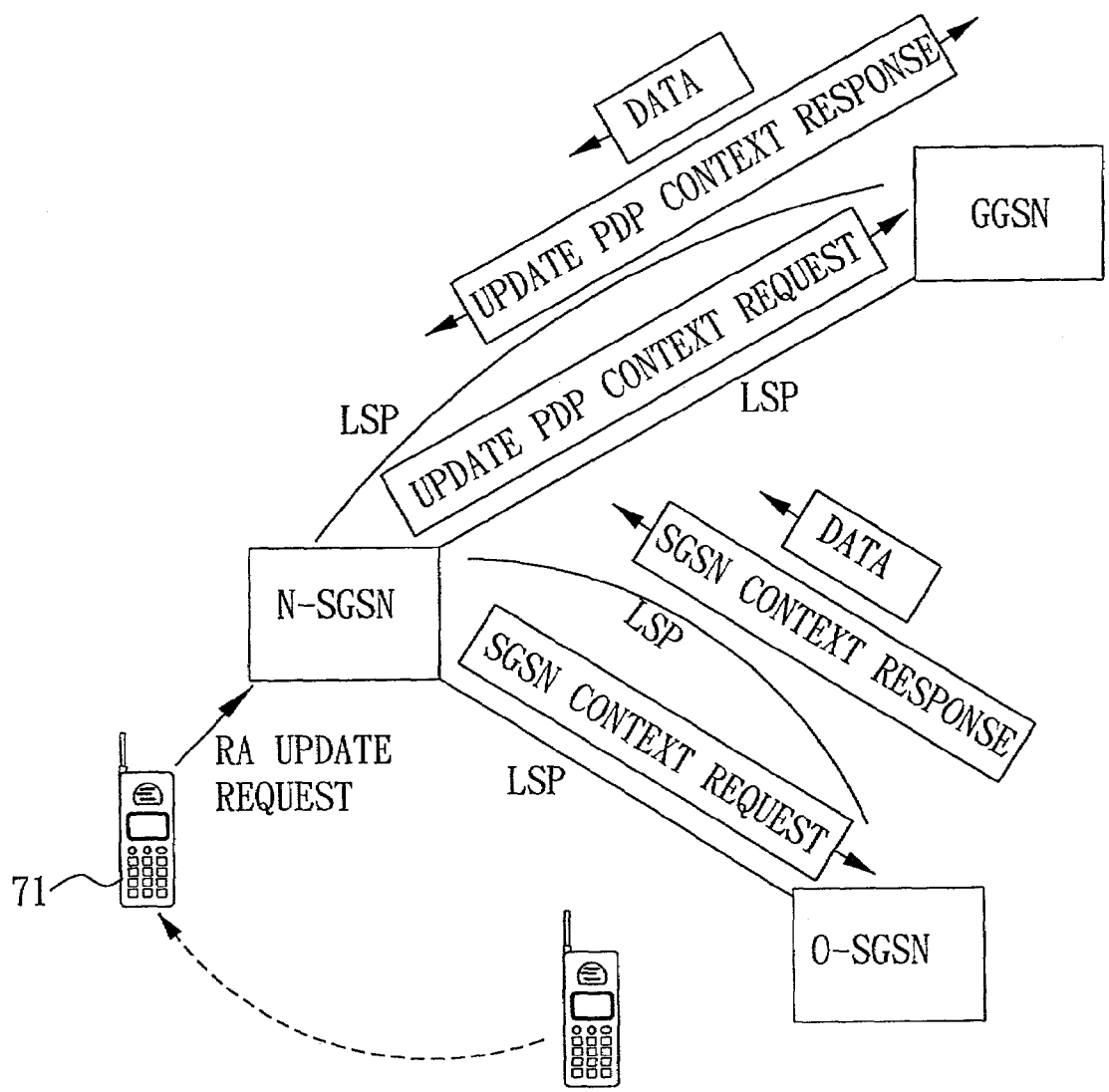
FIG. 7 shows a flow of the inter-SGSN handoff procedure in accordance with the present invention.

The LSPs pre-created by the above flow can be subsequently used by the inter-SGSN handoff procedure. FIG. 7 shows the inter-SGSN handoff procedure flow that does not require QoS data stream. As shown, when a MS 71 moves from an old SGSN (O-SGSN) routing area to a new SGSN (N-SGSN) routing area, the MS 71 will issue a RA update request to the N-SGSN. When receiving the RA update request, the N-SGSN starts to select a pre-created LSP targeted to the O-SGSN, and uses this pre-created LSP to send a SGSN context request. Then, when receiving the SGSN context request transmitted from the N-SGSN, the O-SGSN also selects a pre-created LSP targeted to the N-SGSN, and uses this pre-created LSP to send a SGSN context response. At this moment, because the data stream does not require QoS, the O-SGSN stores the pre-created LSP ID in the new SGSN address field of the PDP context, and then forwards data to the N-SGSN. Next, when receiving the SGSN context response issued from the O-SGSN, the N-SGSN also selects a pre-created LSP targeted to the GGSN, and uses this pre-created LSP to send an update PDP context request. Then, when receiving the update PDP context request issued from the N-SGSN, the GGSN also selects a pre-created LSP targeted to the N-SGSN, and uses this pre-created LSP to send an update PDP context response. At this moment, because the data stream does not require QoS, the GGSN stores the pre-created LSP ID in the PDP context SGSN address field, and then starts to transmit data to the N-SGSN. The N-SGSN will receive the update PDP context response issued from the GGSN.

In the above flow, if the GGSN or the SGSN cannot find a corresponding pre-created LSP, conventional IP routing is employed to send GTP signals to the corresponding destination, and a LSP targeted to the destination is immediately created.

Figure 8:
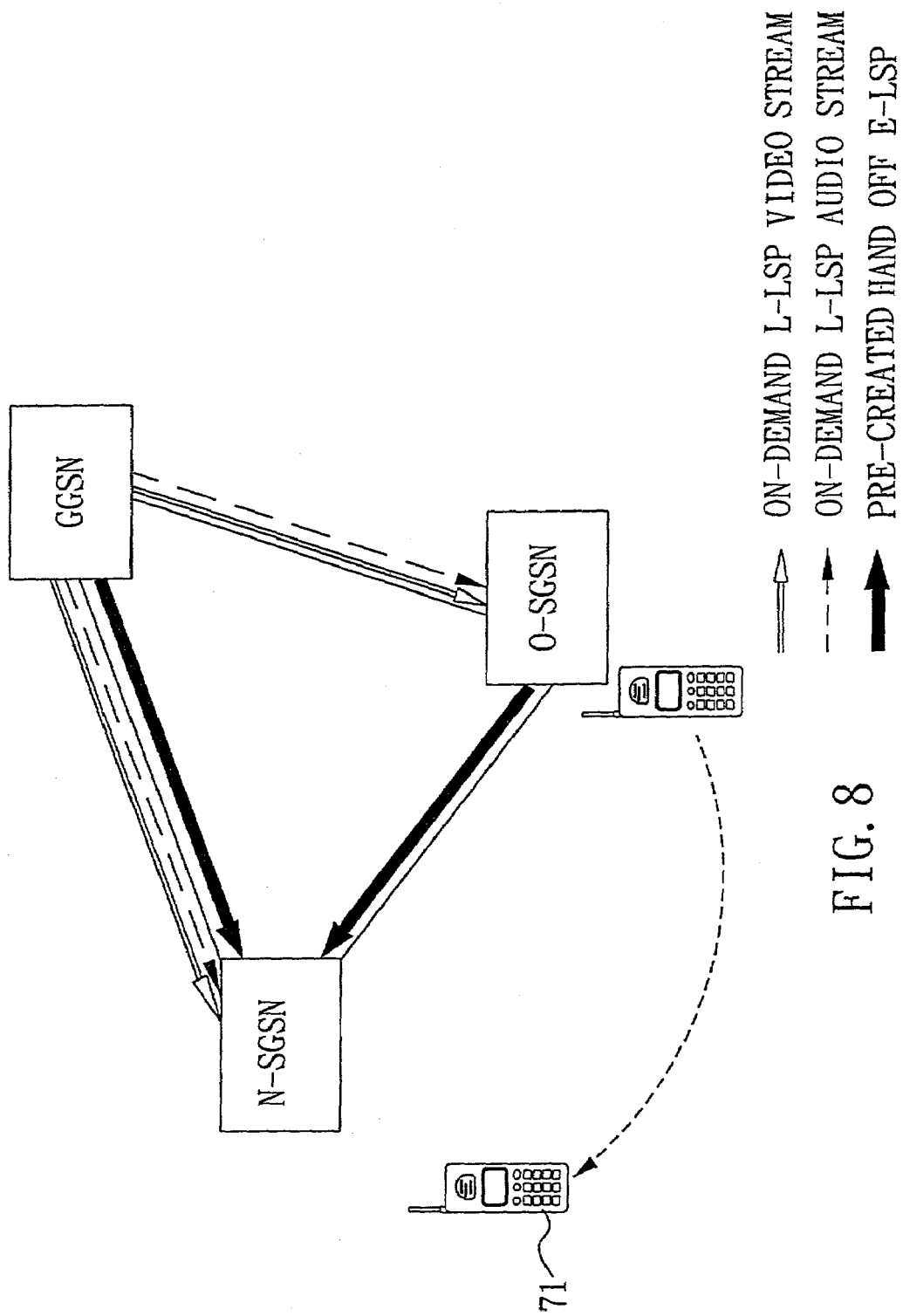
FIG. 8 shows the real-time streams management during inter-SGSN handoff.

In the present invention, real-time data stream utilizes on-demand L-LSP to transmit packets with the QoS. Therefore, when the MS to which the real-time stream belongs performs an inter-SGSN handoff operation, the system must assures the minimum tolerable QoS for the real-time data stream in the N-SGSN while performing handoffs or after handoffs. As aforementioned, the present invention utilizes the handoff EXP inferred per hob behavior scheduling class LSP (E-LSP) pre-created between the O-SGSN and the N-SGSN to forward the packets passing the O-SGSN in the handoff procedure to the N-SGSN. In addition, once the handoff procedure is completed, the packets no longer pass the O-SGSN. However, the on-demand L-LSP between the GGSN and the N-SGSN has not been created. The packets of the real-time data stream can be transmitted by temporarily using the pre-created handoff E-LSP between the GGSN and N-SGSN, as shown in FIG. 8.

In order to assure the minimum tolerable QoS for the real-time data stream in the N-SNSN in performing handoffs or after handoffs, each pre-created handoff E-LSP must reserve suitable bandwidth. The reserved bandwidth can be estimated by a bandwidth estimation model $B(m, \lambda/\mu)$ established by the Erlang formula, where m represents the number of MSs currently sharing the same handoff E-LSP, $\lambda$ represents the number of MSs that performs the handoff procedure between two adjacent SGSNs in an average time of 1 second, $1/\mu$ represents either an average time for performing an inter-SGSN handoff when the handoff E-LSP is between the O-SGSN and the N-SGSN, or an average time for creating an on-demand L-LSP when the handoff E-LSP is between the GGSN and the N-SGSN. Therefore, when there are m MSs sharing the same handoff E-LSP at the same time, the blocking probability (Pm) is as follows:

$$p_m = \frac{\left(\frac{\lambda}{\mu}\right)^m / m!}{\sum_{k=0}^{m} \left(\frac{\lambda}{\mu}\right)^k / k!}.$$

Based on statistical data, $\lambda$ and $1/\mu$ can be determined. Furthermore, a minimum tolerable blocking probability (such as $Pm \leq 2\%$) can be defined in the system. According to the above formula, the maximum of m can be determined.

Then, the reserved bandwidth ($B_{hand\text{-}off}$) of this handoff E-LSP is: $B_{hand\text{-}off}=m\times Brt$, where Brt represents the averaged minimum required bandwidth of the whole data stream in one MS.

In view of the foregoing, it is known that the present invention is provided to construct a MPLS network technique in the GPRS backbone network, so as to simplify the protocol stack of the original GPRS network, shorten the packet header and utilize the MPLS features to eliminate the drawbacks in the conventional arts. The advantages of the present invention are summarized as follows:

(1) Shortening packet header: The present invention simplifies the signalling plane protocol stack from a five-layer architecture to a three-layer architecture, and also simplifies the transmission plane protocol stack from a six-layer architecture to a four-layer architecture. Furthermore, because label addressing is used to replace the IP addressing, the address field is also shortened.

(2) Reducing routing delay: The present invention pre-creates LSP connections for all one-to-one nodes in the GPRS backbone network when initializing the system. With these pre-created LSP connections, control signals and data packets are transmitted. That is, the LSP connection (at the data link layer of the second layer protocol) is used to eliminate the delays (at the network layer of the third layer protocol) caused by the IP packet routing through each router.

(3) Supporting QoS: The present invention utilizes RSVP protocol to create a LSP connection with the QoS (which can be classified into L-LSP and E-LSP). In addition, the present invention also utilizes pre-created handoff E-LSP to satisfy the requirement of the minimum tolerable QoS for the real-time data stream in the MS performing the handoff procedure. Also, the present invention provides a mathematical model to analyze and evaluate the required bandwidth for reservation by the handoff E-LSP. Accordingly, it is able to reserve exact sufficient bandwidth for all MSs moving from one SGSN to another SGSN at the same time under the tolerable blocking probability requirement, thereby making the real-time data stream satisfy the minimum tolerable QoS requirement.

Although the present invention has been explained in relation to its preferred embodiment, it is to be understood that many other possible modifications and variations can be made without departing from the spirit and scope of the invention as hereinafter claimed.

What is claimed is:

1. A system for applying a multi-protocol label switching (MPLS) network in general packet radio service (GPRS), the MPLS network being established by multiple differentiated service (DS) domains, each DS domain constructed by multiple label switching routers (LSRs) and label edge routers (LERs), the system comprising:

at least a LER for use as a service GPRS supporting node (SGSN) connected to a wireless network base station, the SGSN interfacing to the LSR of its DS domain via a Gn interface; and at least a LER for use as a gateway GPRS supporting node (GGSN) connected to a packet switching network, the GGSN interfacing to the LSR of its DS domain via the Gn interface, wherein the Gn interface at a signalling plane between two SGSNs, between two GGSNs, or between a SGSN and a GGSN has a protocol stack including a physical layer, a MPLS layer over the physical layer and a RSVP/GTP layer over the MPLS layer, so as to utilize IP addresses of all SGSNs and GGSNs to establish all one-to-one pre-created label switching paths (LSPs) in the MPLS network of a GPRS backbone network in an initial state; the Gn interface at a transmission plane for GGSN has a protocol stack including a physical layer, a MPLS layer over the physical layer, a GTP layer over the MPLS layer and an IP layer over the GTP layer; the Gn interface at a transmission plane for SGSN has a protocol stack including a physical layer, a MPLS layer over the physical layer, a GTP layer over the MPLS layer and a relay layer over the GTP layer, so as to transmit packets between SGSN and GGSN by pre-created LSP and LSP tunneling.

2. The system as claimed in claim 1, wherein the to be transmitted is formed by packaging a GTP header in front of an IP packet, and packaging a MPLS header in front of the GTP header.

3. The system as claimed in claim 2, wherein the MPLS header has a label corresponding to the LSP.

4. The system as claimed in claim 2, wherein the GTP header carries an international mobile subscriber identifier and a network layer service access point identifier for enabling SGSN to identify a mobile station in the wireless network and transmitting packets to a designated mobile station via the wireless network.

5. A method for applying a multi-protocol label switching (MPLS) network in general packet radio service (GPRS), the MPLS network being established by multiple differentiated service (DS) domains, each DS domain being constructed by multiple label switching routers (LSRs) and label edge routers (LERs), the LER at least providing a service GPRS supporting node (SGSN) connected to a wireless network base station, and a gateway GPRS supporting node (GGSN) connected to a packet switching network, the method comprising the steps of:

(A) at a signalling plane, utilizing IP addresses of all SGSNs and GGSNs to establish all one-to-one pre-created label switching paths (LSPs) in the MPLS network of the GPRS backbone network, wherein the pre-created LSP is established by the substeps of:

(A1) a LER used as an ingress node issuing a path message including LABEL REQUEST with Explicit Route (ER) path;

(A2) forwarding the path message to all LSRs on the ER path, so as to establish a label mapping table in each LSR, the label mapping table having an input link number and a corresponding label;

(A3) a LER used as an egress node determining traffic/QoS parameters of the LSP, and then placing the parameters together with labels mapping to an input link in a response message for delivery to the ingress node along an original path;

(A4) sending the response message to all LSRs on the ER path, so as to fill in an output link number and a corresponding label in the label mapping table;

(A5) establishing a LSP label mapping table when the ingress node receives the response message; and (B) at a transmission plane, transmitting packets between SGSN and GGSN by the pre-created LSP and LSP tunneling.

6. The method as claimed in claim 5, wherein in step (A1), the path message further includes a DIFFSERV object for the LSP to reserve bandwidth on the LSR of the path.

7. The method as claimed in claim 6, wherein in step (A2), the LSR reserves appropriate bandwidth based on the DIFFSERV object and its capability.

8. The method as claimed in claim 7, wherein in step (A3), the egress node determines traffic/QoS parameters of the LSP by referencing the DIFFSERV object and its capability.

9. The method as claimed in claim 7, wherein in step (A4), the LSR updates the reserved bandwidth based on the traffic/QoS parameters of the response message.

10. The method as claimed in claim 5, further comprising a PDP context activation procedure, which comprises the steps of:
(C1) when the SGSN receives an activate PDP context request from a mobile station, selecting a pre-created LSP going to GGSN, and using the pre-created LSP to transmit a create PDP context request;
(C2) when the GGSN receives the create PDP context request transmitted from the SGSN, selecting a pre-created LSP going to the SGSN, and using the pre-created LSP to transmit a create PDP context response;
(C3) the GGSN determining whether QoS is required for the data stream;
(C4) if QoS is required, the GGSN establishing a Label only inferred per hob behavior scheduling class LSP (L-LSP) going to the SGSN, storing the ID of the L-LSP in a SGSN address field of the PDP context, and then transmitting data to the SGSN; and
(C5) if QoS is not required, the GGSN storing ID of the pre-created LSP in the SGSN address field of the PDP context, and then transmitting data to the SGSN. The SGSN then receives the create PDP context response transmitted from the GGSN.

11. The method as claimed in claim 5, further comprising an inter-SGSN handoff procedure, which comprises the steps of:
(D1) when a mobile station moves from a first SGSN routing area to a second SGSN routing area, issuing a RA update request to the second SGSN;
(D2) when the second SGSN receives the RA update request, selecting a pre-created LSP going to the first SGSN to send a SGSN context request;
(D3) when the first SGSN receives the SGSN context request transmitted from the second SGSN, selecting a pre-created LSP going to the second SGSN to send a SGSN context response;
(D4) the first SGSN storing the ID of the pre-created LSP in a new SGSN address field of the PDP context, and then forwarding data to the second SGSN;
(D5) when the second SGSN receives the SGSN context response, selecting a pre-created LSP going to the GGSN to send an update PDP context request;
(D6) when the GGSN receives the update PDP context request, selecting a pre-created LSP going to the second SGSN to send an update PDP context response; and
(D7) the GGSN storing ID of the pre-created LSP in a SGSN address field of the PDP context, and then transmitting data to the second SGSN.

12. The method as claimed in claim 11, wherein each pre-created LSP reserves a predetermined bandwidth.

* * * * *